United States Patent
Komatsuzaki et al.

(10) Patent No.: US 6,291,583 B1
(45) Date of Patent: Sep. 18, 2001

(54) AROMATIC VINYL/ISOPRENE BLOCK COPOLYMER, PROCESS FOR THE PRODUCTION THEREOF, AND HARDENABLE PRESSURE-SENSITIVE ADHESIVE COMPOSITION CONTAINING THE SAME

(75) Inventors: Shigeru Komatsuzaki, Yokohama; Hidemi Tsubaki; Tetsuaki Matsubara, both of Kawasaki, all of (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/297,367
(22) PCT Filed: Oct. 30, 1997
(86) PCT No.: PCT/JP97/03967
§ 371 Date: Apr. 30, 1999
§ 102(e) Date: Apr. 30, 1999
(87) PCT Pub. No.: WO98/18840
PCT Pub. Date: May 7, 1998

(30) Foreign Application Priority Data

Oct. 30, 1996 (JP) .................................................... 8-305821

(51) Int. Cl.⁷ ............................ C08L 53/02; C08F 297/04
(52) U.S. Cl. ............................ 525/95; 525/89; 525/314
(58) Field of Search ................................ 525/89, 95, 314

(56) References Cited

U.S. PATENT DOCUMENTS 5,399,627 * 3/1995 Diehl et al. .............................. 525/95
5,420,203 * 5/1995 Dillman et al. ......................... 525/98
5,516,835 * 5/1996 Ishiguro et al. ....................... 524/505

FOREIGN PATENT DOCUMENTS

| 63 86745 | 4/1988 | (JP) . |
| 63 89562 | 4/1988 | (JP) . |
| 64 81844 | 3/1989 | (JP) . |
| 1266156 | 10/1989 | (JP) . |
| 6228522 | 8/1994 | (JP) . |
| 6509595 | 10/1994 | (JP) . |
| 7238206 | 9/1995 | (JP) . |
| 7238207 | 9/1995 | (JP) . |

\* cited by examiner

*Primary Examiner*—Tae H. Yoon
(74) *Attorney, Agent, or Firm*—Birch, Stewart, Kolasch & Birch, LLP

(57) ABSTRACT

An aromatic vinyl compound-isoprene block copolymer composition comprising (i) 5–50 wt. % a branched copolymer of the formula: $(A-B)_nX$ wherein A is a polymer block of an aromatic vinyl monomer, B is a polymer block of isoprene, and X is a residue of a polyfunctional coupling agent, and (ii) 50–95 wt. % of a diblock copolymer of the formula: A-B wherein A and B are as defined above. This copolymer composition is produced by allowing an aromatic vinyl monomer to contact with an organic lithium initiator to prepare a polymer block A; incorporating isoprene thereto to prepare a diblock copolymer A-B; and then, adding a polyfunctional coupling agent to convert a part of the diblock copolymer A-B to the branched copolymer $(A-B)_nX$. This block copolymer composition is useful for an adhesive or pressure sensitive adhesive composition.

19 Claims, No Drawings

AROMATIC VINYL/ISOPRENE BLOCK COPOLYMER, PROCESS FOR THE PRODUCTION THEREOF, AND HARDENABLE PRESSURE-SENSITIVE ADHESIVE COMPOSITION CONTAINING THE SAME

This application is the national phase number 35 U.S.C. §371 of PCT International Application No. PCT/JP97/03967 which has an International filing date of Oct. 30, 1997 which designated the United States of America.

1. Technical Field

This invention relates to an aromatic vinyl compound-isoprene block copolymer composition which is useful as a hot-melt adhesive and other adhesives, a process for producing the copolymer composition, and an adhesive or pressure sensitive adhesive composition-comprising the copolymer composition.

2. Background Art

A polystyrene-polyisoprene block copolymer and other block copolymers have widely been used as a base polymer for an adhesive or pressure sensitive adhesive composition. Especially a styrene-isoprene-styrene block copolymer is known as a base polymer for a hot-melt adhesive.

For the production of disposable diapers, sanitary napkins and the like, a hot-melt adhesive is applied to a thermoplastic sheet or a nonwoven fabric made of a thermoplastic fiber by spiral spraying or other means. As the hot-melt adhesive, those which are applicable at a low melt-viscosity and a low temperature are desired with a view to preventing discoloration of adherends such as polyethylene sheet and deterioration of the hot-melt adhesive. The hot-melt adhesives are generally desired to have a melt viscosity of not larger than 5,000 cps at a temperature of 150° C. However, a hot-melt adhesive composed of a styrene-isoprene block copolymer, which has such a low melt-viscosity upon fusion and exhibits satisfactory peel adhesion and shear adhesion failure temperature (SAFT), has not been proposed yet.

In U.S. Pat. No. 5,399,627, a styrene-isoprene block copolymer composition is disclosed, which is produced by a process wherein a polystyrene-polyisoprene diblock copolymer having a minor proportion of a poybutadiene block bound to a terminal thereof is coupled with a coupling agent having four functionalities, and which is composed of a predominant proportion of the thus-produced copolymer with four branches and a minor proportion of an unreacted diblock copolymer. This block copolymer composition contains only not larger than 29% by weight of the unreacted diblock copolymer, and exhibits a poor peel adhesion when it is applied to a hot-melt adhesive.

In Japanese Unexamined Patent Publication No. H1-266156, a styrene-isoprene block copolymer composition is disclosed, which is produced by a process wherein a polystyrene-polyisoprene diblock copolymer is reacted with a tetrafunctional coupling agent in an amount of at least equivalent to an initiator, and which is composed of a branched copolymer with three branches and an unreacted diblock copolymer. An adhesive made of this block copolymer composition has a poor peel adhesion and a low shear adhesion failure temperature.

Further, in the above-mentioned Japanese patent publication, another styrene-isoprene block copolymer composition is disclosed which is composed of a large amount of a polystyrene-polyisoprene diblock copolymer and a minor amount of a branched copolymer with three branches. An adhesive of this block copolymer composition has a low shear adhesion failure temperature.

DISCLOSURE OF INVENTION

An object of the present invention is to provide a block copolymer composition which is useful as a hot-melt adhesive or other adhesives, which has satisfactory properties required for a hot-melt adhesive, especially has a low melt-viscosity and a low application temperature, and exhibits well balanced and high peel adhesion and shear adhesion failure temperature; and a process for producing the block copolymer composition.

Another object of the present invention is to provide an adhesive or pressure sensitive adhesive composition useful as a hot-melt adhesive or other adhesives, which has a low melt-viscosity and a low application temperature, and exhibits well balanced and high peel adhesion and shear adhesion failure temperature.

The inventors conducted extensive research for achieving the above-mentioned objects, and, found that an adhesive or pressure sensitive adhesive composition comprising a specific styrene-isoprene block copolymer composition and a tackifier is highly effective as an adhesive attaining the objects, which is easily produced by a process wherein styrene is polymerized by using an organic lithium initiator to give a polymer block A of styrene; isoprene is polymerized in the presence of the polymer block A to prepare a polymer block B of isoprene and further bind the two polymer blocks A and B together to give an A-B block copolymer; and then the A-B block copolymer is allowed to react with a predetermined amount of a coupling agent having at least four functionalities, and which comprises 5 to 43.9% by weight of a branched copolymer having at least four branches and 56.1 to 95% by weight of an unreacted diblock copolymer. Based on this finding, the present invention has been completed.

Thus, in accordance with the present invention, there is provided an aromatic vinyl compound-isoprene block copolymer composition comprising:

(i) 5 to 43.9% by weight of a branched copolymer having at least four branches, represented by the following general formula (I):

wherein A is a polymer block of an aromatic vinyl monomer, B is a polymer block of isoprene, X is a residue of a polyfunctional coupling agent having at least four functionalities, and n is an integer of at least 4, and (ii) 56.1 to 95% by weight of a diblock copolymer represented by the following general formula (II):

wherein A' is a polymer block of an aromatic vinyl monomer, which may be the same as or different from the polymer block A, and B is a polymer block of isoprene; said block copolymer composition having a weight average molecular weight of 10,000 to 500,000.

In accordance with the present invention, there is further provided a process for producing the above-mentioned aromatic vinyl compound-isoprene block copolymer which comprises the steps of:

allowing an aromatic vinyl monomer to contact with an organic lithium initiator to prepare a polymer block A composed of aromatic vinyl monomer units and having an active terminal exhibiting a polymerization activity;

incorporating isoprene to the polymer block A-containing polymerization system whereby an A-B block copolymer is prepared, which has a structure such that the polymer block A of aromatic vinyl monomer is directly bonded to a polymer block B composed of isoprene units and having an active terminal exhibiting a polymerization activity; and then, adding a coupling agent having at least four functionalities to the A-B block copolymer-containing polymerization system to convert 5 to 43.9% by weight of the A-B block copolymer to a branched copolymer having at least four branches represented by formula (I).

In accordance with the present invention, there is further provided an adhesive or pressure sensitive adhesive composition comprising the above-mentioned aromatic vinyl compound-isoprene block copolymer composition and a tackifier.

Best Mode for Carrying Out the Invention

Aromatic vinyl compound-isoprene block copolymer composition

The aromatic vinyl compound-isoprene block copolymer composition of the present invention is characterized as comprising the branched copolymer of formula (I) and the diblock copolymer of formula (II).

(1) Branched copolymer

The first ingredient, i.e., the branched copolymer of formula (I) contained in the block copolymer composition of the present invention is a block copolymer having at least four branches which is prepared by coupling an A-B block copolymer composed of a polymer block A of aromatic vinyl monomer and a polymer block B of isoprene having an active terminal exhibiting a polymerization activity, with a polyfunctional coupling agent having at least four functionalities.

The aromatic vinyl monomer used for the preparation of the branched copolymer is not particularly limited, and includes, for example, styrene, α-methylstyrene, vinyltoluene and vinylnaphthalene. Of these, styrene is preferable. These aromatic vinyl monomers may be used either alone or as a combination of at least two thereof.

The proportion of the aromatic vinyl monomer units in the branched copolymer is not particularly limited, but, the content of the polymer block of aromatic vinyl monomer units in the entire aromatic vinyl compound-isoprene copolymer composition of the present invention is preferably in the range of 10 to 50% by weight, more preferably 25 to 50% by weight and most preferably 35 to 45% by weight, based on the total weight of the block copolymer composition. For satisfying this content in the entire copolymer composition, the content of polymer block A contained in the branched copolymer is also preferably in the range of about 10 to 50% by weight, more preferably about 25 to 50% by weight and most preferably about 35 to 45% by weight. If the relative proportion of the polymer block A of aromatic vinyl monomer is too small, the shear adhesion failure temperature is lowered. In contrast, if the relative proportion of the polymer block A is too large, the peel adhesion is reduced.

The molecular weight of the branched copolymer is not particularly limited, but, it should appropriately be chosen so that the block copolymer composition of the present invention has a weight average molecular weight (Mw) of 10,000 to 500,000, preferably 50,000 to 250,000 and more preferably 80,000 to 150,000, as expressed in terms of the weight average molecular weight converted by polystyrene standard measured by the gel permeation chromatography (GPC).

The content of the branched copolymer having at least four branches in the aromatic vinyl compound-isoprene block copolymer composition of the present invention is in the range of 5 to 43.9% by weight based on the total weight of the block copolymer composition. If the content of the branched copolymer with at least four branches is too small, the shear adhesion failure temperature is not sufficiently high. If the content of the branched copolymer is too large, the aromatic vinyl compound-isoprene block copolymer composition has an undesirably high viscosity and its proccessability is reduced. The content of the branched copolymer with at least four branches is preferably in the range of 15 to 43.9% by weight and more preferably 25 to 43.9% by weight.

(2) Diblock copolymer

The second ingredient, i.e., the diblock copolymer of formula (II) contained in the block copolymer composition of the present invention is a straight chain diblock copolymer composed of the polymer block A' of aromatic vinyl monomer and the polymer block B of isoprene.

The aromatic vinyl monomer used for the preparation of the diblock copolymer is not particularly limited, and includes, for example, styrene, α-methylstyrene, vinyltoluene and vinylnaphthalene. Of these, styrene is preferable. These aromatic vinyl monomers may be used either alone or as a combination of at least two thereof. As the aromatic vinyl monomer, the same monomer as that used for the preparation of the polymer block A of the branched copolymer is usually used, but a different monomer may be used.

The proportion of the polymer block A' of aromatic vinyl monomer in the diblock copolymer is not particularly limited, but, the content of the polymer block of aromatic vinyl monomer in the aromatic vinyl compound-isoprene copolymer composition of the present invention is in the range of 10 to 50% by weight, preferably 25 to 50% by weight and more preferably 35 to 45% by weight, based on the total weight of the block copolymer composition. For satisfying this content in the entire copolymer composition, the content of polymer block A' contained in the diblock copolymer is also preferably in the range of about 10 to 50% by weight, more preferably about 25 to 50% by weight and most preferably about 35 to 45% by weight. If the relative proportion of polymer block A' of aromatic vinyl monomer is too small, the shear adhesion failure temperature is reduced. In contrast, if the relative proportion of the polymer block A' is too large, the peel adhesion is reduced.

The molecular weight of the diblock copolymer is not particularly limited, but, it should appropriately be chosen so that the block copolymer composition of the present invention usually has a weight average molecular weight (Mw) of 3,000 to 250,000, preferably 15,000 to 200,000 and more preferably 20,000 to 150,000, as expressed in terms of the weight average molecular weight converted by polystyrene standard measured by GPC.

The content of the diblock copolymer in the aromatic vinyl compound-isoprene block copolymer composition of the present invention is in the range of 56.1 to 95% by weight based on the total weight of the block copolymer composition. If the content of the diblock copolymer is too small, the peel adhesion is reduced. In contrast, if the content of the diblock copolymer is too large, the shear adhesion failure temperature is not sufficiently high. The content of the diblock copolymer is preferably in the range of 56.1 to 85% by weight and more preferably 56.1 to 75% by weight.

(3) Other polymer

The aromatic vinyl compound-isoprene block copolymer of the present invention may comprise, in addition to the above-mentioned branched copolymer having at least four branches and the above-mentioned diblock copolymer, a branched copolymer having two branches and a branched copolymer having three branches. That is, the block copolymer composition of the present invention may comprise at least one optional branched copolymer selected from branched copolymers having two or three branches which are represented by the following formula (III):

(A''-B)$_m$X         (III)

wherein A'' is a polymer block of an aromatic vinyl monomer, B is a polymer block of isoprene, X is a residue of a polyfunctional coupling agent, and m is an integer of 2 or 3. As specific examples of the aromatic vinyl monomer used for the polymer block A'', there can be mentioned styrene, α-methylstyrene, vinyltoluene and vinylnaphthalene. Of these, styrene is preferable. These aromatic vinyl monomers may be used either alone or in combination.

However, the amount of the branched copolymer of formula (III) is preferably minor. That is, in order to attain the desired high shear adhesion failure temperature, the sum of a branched copolymer having two branches and a branched copolymer having three branches is preferably smaller than the amount of the branched copolymer having at least four branches. Usually the sum of a branched copolymer having two branches and a branched copolymer having three branches is not larger than 20% by weight, preferably not larger than 15% by weight, based on the weight of the aromatic vinyl compound-isoprene block copolymer.

(4) Physical Properties

The content of aromatic vinyl monomer units in the aromatic vinyl compound-isoprene copolymer is not particularly limited, and, for example, is in the range of 10 to 50% by weight, preferably 25 to 50% by weight and more preferably 35 to 45% by weight, to obtain highly balanced shear adhesion failure temperature and peel adhesion.

The molecular weight of the aromatic vinyl compound-isoprene copolymer composition of the present invention is in the range of 10,000 to 500,000, preferably 50,000 to 250,000 and more preferably 80,000 to 150,000, as expressed in terms of the weight average molecular weight converted by polystyrene standard measured by GPC. If the molecular weight of the copolymer composition is too low, the shear adhesion failure temperature is lowered. In contrast, if the molecular weight of the copolymer composition is too high, the melt viscosity becomes undesirably high and the proccessability is reduced.

The molecular weight distribution of the aromatic vinyl compound-isoprene copolymer composition of the present invention is not particularly limited, but, the ratio (Mw/Mn) of the weight average molecular weight (Mw) to the number average molecular weight (Mn), as expressed in terms of the molecular weight converted by polystyrene standard measured by GPC, is usually not larger than 4, preferably in the range of 1.1 to 3 and more preferably 1.2 to 2.0 to obtain highly balanced shear adhesion failure temperature and peel adhesion.

(5) Production process

The process for producing the aromatic vinyl compound-isoprene copolymer composition of the present invention is not particularly limited, but, the aromatic vinyl compound-isoprene copolymer composition is preferably produced by preparing an A-B diblock copolymer having a structure such that a polymer block B composed of isoprene units and having a terminal exhibiting a polymerization activity is directly bonded to a polymer block of aromatic vinyl monomer units; and then, coupling a part of the A-B diblock copolymer to give a block copolymer having at least four branches, whereby a composition comprising the block copolymer having at least four branches and the diblock copolymer is obtained at one time. More specifically, the preferable process for producing the aromatic vinyl compound-isoprene block copolymer composition comprises the steps of allowing an aromatic vinyl monomer to contact with an organic lithium initiator to prepare a polymer block A composed of aromatic vinyl monomer units and having an active terminal exhibiting a polymerization activity; incorporating isoprene to the polymer block A-containing polymerization system to give an A-B block copolymer having a structure such that a polymer block B composed of isoprene units and having an active terminal exhibiting a polymerization activity is directly bonded to the polymer block A of aromatic vinyl monomer units; and then, adding a coupling agent having at least four functionalities to the A-B block copolymer-containing polymerization system to convert 5 to 50% by weight of the A-B block copolymer to the branched polymer having at least four branches represented by the formula (I).

Alternatively, the aromatic vinyl compound-isoprene copolymer composition can be produced by a process comprising the steps of separately preparing the branched block copolymer having at least four branches and the diblock copolymer, and then, mixing together the thus-prepared two block copolymers at a predetermined mixing ratio.

The steps in the preferable process for producing the aromatic vinyl compound-isoprene block copolymer composition will be described in detail.

(i) In the first step, an aromatic vinyl monomer is polymerized in a polymerization medium by using an organic lithium initiator. As the organic lithium initiator, conventional initiators capable of polymerizing an aromatic vinyl monomer and isoprene are used. As examples of the organic lithium initiator, there can be mentioned organic monolithium initiators such as methyllithium, n-propyllithium, n-butyllithium and sec-butyllithium. Of these, n-butyllithium is preferable. The amount of the organic lithium initiator used can be calculated depending upon the intended molecular weight of the copolymer by the method well known to a person skilled in the art.

The polymerization medium used is not particularly limited provided that it is inactive for the organic lithium initiator, and it includes, for example, open chain hydrocarbon solvents, cyclic hydrocarbon solvents and mixtures thereof. As specific examples of the open chain hydrocarbon solvents, there can be mentioned open chain alkanes and alkenes having 4 to 6 carbon atoms such as n-butane, isobutane, n-hexane and their mixtures; 1-butene, isobutylene, trans-2-butene, cis-2-butene and their mixtures; 1-pentene, trans-2-pentene, cis-2-pentene and their mixtures; and n-pentane, isopentane, neopentane and their mixtures. As specific examples of the cyclic hydrocarbon solvents, there can be mentioned aromatic hydrocarbons such as benzene, toluene and xylene, and alicyclic hydrocarbons such as cyclohexane. With a view to controlling the polymerization temperature, and the molecular weight distribution of the polymer block of aromatic monomer and the aromatic vinyl compound-isoprene block copolymer composition, it is preferable to use a mixed solvent composed of open chain hydrocarbon solvent having 4 to 6 carbon atoms and a cyclic hydrocarbon solvent preferably at a ratio of 5:95 to 40:60 by weight, more preferably 10:90 to 40:60 by weight.

In the present invention, the polymerization of an aromatic vinyl monomer can be conducted in the presence of a polar compound. By using a polar compound, the rate of polymerization and the molecular weight distribution in the polymer block of aromatic vinyl monomer can be controlled. The polar compound used preferably includes aromatic and aliphatic ethers and tertiary amines having a relative dielectric constant of 2.5 to 5.0 at 25° C. As specific examples of such polar compounds, there can be mentioned aromatic ethers such as diphenyl ether and anisole; aliphatic ethers such as diethyl ether and dibutyl ether; tertiary monoamines such as trimethylamine, triethylamine and tripropylamine; and tertiary polyamines such as tetramethylethylenediamine and tetraethylethylenediamine. These polar compounds may be used either alone or as a combination of at least two thereof. The amount of the polar compound used is preferably in the range of 0.001 to 50 moles, more preferably 0.005 to 10 moles, per mole of the organic lithium initiator.

The procedure by which an aromatic vinyl monomer is polymerized is not particularly limited, and any of the conventional procedures can be employed. For example, a batch polymerization procedure wherein the entire amount of the aromatic vinyl monomer and the entire amount of the initiator are charged at one time in the polymerization system to effect polymerization; a continuous polymerization procedure wherein the aromatic vinyl monomer and the initiator are continuously incorporated in the polymerization system; and a polymerization procedure wherein a part of the aromatic vinyl monomer and a part of the initiator are charged to conduct polymerization until a predetermined conversion is reached, and then, the remainders of the monomer and initiator are added to continue polymerization can be employed. The polymerization temperature is usually in the range of 0° C. to 90° C., preferably 20° C. to 80° C. In the case where the reaction temperature is difficult to control, reflux cooling is preferably conducted by using a reactor equipped with a reflux condenser.

(ii) In the second step, isoprene is incorporated into the polymerization system comprising the thus-produced polymer block A of aromatic vinyl monomer having an active terminal exhibiting a polymerization activity to effect polymerization of isoprene to give an A-B block copolymer having a structure such that a polymer block B composed of isoprene units and having an active terminal exhibiting a polymerization activity is directly bonded to the polymer block A of aromatic vinyl monomer units. The incorporation of isoprene can be carried out continuously to control the heat of reaction.

(iii) After the completion of polymerization of isoprene, a polyfunctional coupling agent having at least four functionalities is incorporated in the polymerization system whereby the A-B block copolymer having an active terminal is bonded to each other to give the block copolymer having at least four branches represented by formula (I). A compound capable of accelerating the coupling reaction can be added, if desired.

To obtain the block copolymer having at least four branches, a coupling agent capable of providing at least four sites capable of reacting with the active terminals exhibiting a polymerization activity must be used. As examples of the coupling agent, there can be mentioned silane compounds such as halogenated silanes and alkoxysilanes; tin compounds such as tin halides; polycarboxylic acid esters; epoxy compounds such as epoxidized soybean oil; acrylic acid esters such as pentaerythritol tetraacrylate; epoxysilanes; and divinyl compounds such as divinylbenzene. Of these, tetrafunctional coupling agents are preferable, and, as specific examples thereof, there can be mentioned tetrachlorosilane, tetrabromosiane, tetramethoxysilane, tetraethoxysilane, tetrachlorotin and diethyl adipate. Provided that the object of the invention is achieved, these coupling agents can be used either alone or as a combination of at least thereof. These coupling agents may be used in combination with bi- or tri-functional coupling agents.

The amount of the coupling agent used in the present invention is important, and should appropriately be chosen so that the branched copolymer having at least four branches and the diblock copolymer are produced at the predetermined ratio, although the optimum ratio varies depending upon the particular kind of coupling agent. The amount of the coupling agent is usually in the range of 0.001 to 0.2 mole, preferably 0.01 to 0.15 mole and more preferably 0.02 to 0.12 mole per mole of the organic lithium initiator. By using this amount of the coupling agent, the branched copolymer having at least four branches is produced in an amount of 5 to 50% by weight, preferably 15 to 50% by weight and more preferably 25 to 45% by weight, based on the total weight of the block copolymer composition. If the amount of the coupling agent is too large, a block copolymer having two branches and represented by the formula $(A-B)_2$X, a block copolymer having three branches and represented by the formula $(A-B)_3$X and a straight chain block copolymer having a residue of the coupling agent at a terminal and represented by the formula A-B-X are produced in large amounts (in these formulae, A, B and X are as defined above), and only a minor amount of the branched copolymer having at least four branches is produced.

An appropriate amount of the coupling agent can be determined by calculation depending upon the compositions of the branched copolymer and the diblock copolymer in the intended block copolymer composition. Actually, deactivation of the organic lithium initiator and the coupling agent, and other factors must be considered, and thus, the optimum amount thereof is preferably determined by conducting preliminary experiments. According to the need, a reaction stopper such as methanol can be used to control the coupling percentage.

(iv) After the completion of coupling, a reaction stopper such as water, an alcohol or an acid is added to deactivate the polymerization active sites. An antioxidant is added to the polymerization product, and then, a polymer is separated by a conventional procedure, for example, a steam stripping procedure, followed by drying, whereby the aromatic vinyl compound-isoprene block copolymer composition of the present invention comprising the branched copolymer having at least four branches and an uncoupled copolymer, i.e., the diblock copolymer, is obtained.

As mentioned above, it is possible that the diblock copolymer of formula (A'-B) is prepared separately from the branched copolymer having at least four branches, and then, the diblock copolymer is mixed together with the branched copolymer having at least four branches. The diblock copolymer can be prepared by a process wherein a straight chain (A'-B) diblock copolymer having a structure such that a polymer block B of isoprene having an active terminal exhibiting a polymerization activity is directly bonded to a polymer block A' of aromatic vinyl monomer is prepared in a manner similar to the above-mentioned steps (i) and (ii); and the polymerization active sites are deactivated, an antioxidant is added, and then, the (A'-B) diblock copolymer is separated and dried without subjected to a coupling reaction in a manner similar to the above-mentioned step (iv).

Adhesive or Pressure Sensitive Adhesive composition

The adhesive or pressure sensitive adhesive composition of the present invention comprises the above-mentioned aromatic vinyl compound-isoprene block copolymer composition and a tackifier.

In the adhesive or pressure sensitive adhesive composition of the present invention, rubber ingredients can be incorporated provided that the intended adhesive properties are obtained, which ingredients include, for example, styrene block copolymers such as a styrene-butadiene-styrene block copolymer, a styrene-ethylene-butylene-styrene block copolymer and a styrene-ethylene-propylene-styrene block copolymer; diene polymer rubbers such as butadiene rubber and isoprene rubber; and natural rubber.

The tackifier used in the present invention is not particularly limited, and includes, for example, natural resin and synthetic resin tackifiers which are known and conventionally used in general adhesive compositions. The natural resin tackifier includes rosin type resins and terpene type resins. As specific examples of the rosin type resins, there can be mentioned rosins such as gum rosin, tall rosin and wood rosin; modified rosins such as hydrogenated rosin, disproportionated rosin and polymerized rosin; and esters such as glycerol ester and pentaerythritol esters, of these rosins and modified rosins. As specific examples of the terpene type resins, there can be mentioned terpene resins such as α-pinene, β-pinene and dipentene (limonene); aromatic modified terpene resins; hydrogenated terpene resins; and terpene-phenol resins. The synthetic resin tackifier includes a polymerized type and a condensed type. As specific examples of the polymerized type resin, there can be mentioned petroleum resins such as aliphatic ($C_5$)petroleum resins, aromatic ($C_9$)petroleum resins, copolymerized ($C_5$/$C_9$) petroleum resins, hydrogenated petroleum resins (alicyclic petroleum resins), DCPD and other alicyclic petroleum resins; cumarone-indene resins; and pure-monomer petroleum resins such as styrene resins and substituted styrene resins. As specific examples of the condensed type resins, there can be mentioned phenol resins such as alkyl phenol resins and rosin-modified phenol resins, and xylene resins. Of these, petroleum resins, especially alicyclic petroleum resins are preferable.

The tackifier can be used either alone or as a combination of at least two thereof. The amount of the tackifier is usually in the range of 10 to 500 parts by weight, preferably 50 to 350 parts by weight and more preferably 70 to 250 parts by weight, based on 100 parts by weight of the aromatic vinyl compound-isoprene block copolymer composition.

In the adhesive or pressure sensitive adhesive composition of the present invention, if desired, rubber ingredients can be incorporated provided, which include, for example, styrene block copolymers such as a styrene-butadiene-styrene block copolymer, a styrene-ethylene-butylene-styrene block copolymer and a styrene-ethylene-propylene-styrene block copolymer; diene polymer rubbers such as butadiene rubber and isoprene rubber; and natural rubber. Additives can also be incorporated, which include, for example, a softening agent (plasticizer), an antioxidant, a heat stabilizer, an ultraviolet absorber and a filler.

The softening agent includes those which are known and conventionally used for adhesive or pressure sensitive adhesive compositions, such as aromatic, paraffinic and naphthenic extender oils, and liquid polymers, for example, polybutene and polyisobutylene. Of these, paraffinic and naphthenic extender oils are preferable. The amount of the softening agent is usually in the range of 10 to 500 parts by weight, preferably 20 to 300 parts by weight and more preferably 30 to 150 parts by weight, based on 100 parts by weight of the aromatic vinyl compound-isoprene block copolymer composition because good viscosity characteristics are obtained and undesirable bleeding can be minimized.

As specific examples of the antioxidant, there can be mentioned hindered phenol compounds such as 2,6-di-tert.-butyl-p-cresol, pentaerythrityl tetrakis[3-(3,5-di-tert.-butyl-4-hydroxyphenyl)propionate] and 2,4-bis-(n-octylthio)-6-(4-hydroxy-3,5-di-tert.-butylanilino)-1,3,5-triazine; thiodicarboxylate esters such as dilauryl thiodipropionate; and phosphate salts such as tris(nonylphenyl) phosphate, 4,4'-butylidene-bis(3-methyl-6-tert.-butylphenyl)-ditridecyl phosphate. These antioxidants may be used either alone or in combination.

The adhesive or pressure sensitive adhesive composition of the present invention can be used as a solvent type adhesive or pressure sensitive adhesive composition dissolved in a solvent such as n-hexane, cyclohexane, benzene and toluene; an emulsion type adhesive or pressure sensitive adhesive composition, which is an aqueous emulsion prepared by dispersing in water by using an emulsifier; or a hot-melt type adhesive or pressure sensitive adhesive composition which contains no solvent. Especially the adhesive or pressure sensitive adhesive composition is suitable for a hot-melt adhesive.

The hot melt adhesive is especially suitable for making disposable goods such as disposable diapers, sanitary napkins, hospital gowns, bed pads and surgery drapes; and for use as constructive adhesive, elastic adhesives, and other uses. It also is suitable for making pressure sensitive adhesive tapes, labels, books and assemblies. The pressure sensitive adhesive tapes include a broad range of tapes such as those which are used for packaging tapes, office stationery, double coated tapes, masking tapes and electrical insulation tapes. The adhesive or pressure sensitive adhesive composition exhibits a high peel adhesion. It further exhibits a low viscosity no matter how it is applied as a solvent adhesive or a hot melt adhesive, and thus, it has good proccessability for coating. When the adhesive or pressure sensitive adhesive composition is used for making labels, it exhibits low viscosity and high peel adhesion, and thus, the proccessability for coating and adhesion characteristics are satisfactory, and further, the coated sheet exhibits good die-cuttability.

The invention will now be described by the following working examples. In the examples and comparative examples, parts and % are by weight unless otherwise specified.

In the working examples, molecular weights of polymers were determined by a high performance liquid chromatography using tetrahydrofuran as a carrier and expressed in terms of a weight average molecular weight (Mw) converted by polystyrene standard. The amount of respective ingredients in the copolymer composition was calculated from the area of peak as obtained by a high performance liquid chromatography.

EXAMPLE 1

Preparation of Block Copolymer Composition

A 50 liter pressure-resistant reactor was charged with 18.75 kg of a mixed solvent composed of 30% n-butane/70% cyclohexane, 240 milli-mole of dibutyl ether (relative dielectric constant: 3.06 at 25° C.) and 230 milli-mole of n-butyl lithium as an initiator. Then 3.04 kg of styrene was incorporated in the reactor to conduct polymerization at 30° C. for one hour, and then, 4.96 kg of isoprene was added to conduct polymerization for about 1.5 hours while the reaction temperature was controlled to fall between 50° C. and 60° C. by reflux cooling. Then 25 milli-mole of tetramethoxysilane as a coupling agent was added to conduct a coupling reaction for 2 hours. Thereafter, 50 ml of methanol as a polymerization stopper and 40 g of 2,6-di-tert.-butyl-p-cresol were added and the mixture was thoroughly mixed together. Then the mixed solution was gradually added dropwise to hot water maintained at a temperature of 85 to 95° C. to evaporate off the solvent from the solution. The thus-obtained polymer was subjected to pulverization and hot-air drying to give a block copolymer composition. The block copolymer composition had a styrene content of 38% by weight, a weight average molecular weight (Mw) of 96,000 as expressed in terms of that of polystyrene, and a molecular weight distribution (Mw/Mn) of 1.43. The copolymer composition was composed of 35.3% of a branched copolymer having four branches, 4.7% of a branched copolymer having three branches, 1.2% of a branched copolymer having two branches and 58.8% of a diblock copolymer.

Adhesive Composition

A kneader having stirring blades was charged with 30 parts by weight of the above-mentioned block copolymer composition, and then, 50 parts of a tackifier "Alkon M-100" supplied by Arakawa Chem. Ind. Co.), 20 parts of naphthenic process oil ("Shellflex 371" supplied by Shell Chem. Co.) and 0.2 part of an antioxidant ("Irganox 1010" supplied Ciba-Geigy Co.) were added. After the atmosphere in the kneading system was substituted with nitrogen, kneading was conducted at a temperature of 160 to 180° C. to prepare an adhesive or pressure sensitive adhesive composition. The melt viscosity of the adhesive or pressure sensitive adhesive composition was measured at 150° C. by using a Brookfield thermogel viscometer. A polyester film having a thickness of 30 μm was coated with the adhesive or pressure sensitive adhesive composition to a thickness of 30 μm, and adhesive properties of the adhesive coating were evaluated.

Evaluation of Adhesive Properties

The peel adhesion (N/m) was evaluated according to PSTC-1 (Peel adhesion test at 180° angle issued by Pressure Sensitive Tape Council, U.S.A.) by using stainless steel or polyethylene as an adherend material.

The shear adhesion failure temperature (° C.) was measured by using stainless steel as an adherend material at an adhered area of 10×25 mm, a load of 1 kg and a temperature elevation rate of 0.5° C./min. The evaluation results are shown in Table 1.

EXAMPLES 2 to 5

Comparative Examples 1 to 7

Block copolymer compositions were prepared and their characteristics were evaluated, and adhesive compositions were prepared from the block copolymer compositions and their adhesive properties were evaluated, by substantially the same procedures as described in Example 1, wherein tetrachlorosilane (TCS) was used instead of tetramethoxysilane (TMS) as a coupling agent and the amount of the coupling agent was varied as shown in Tables 1 and 2 in Examples 2 and 3, and Comparative Example 1; phenyltrichorsilane (PTCS) was used instead of TMS as a coupling agent and the amount of the coupling agent was varied as shown in Table 2 in Comparative Example 2; and the amount of tetramethoxysilane (TMS) was varied as shown in Tables 1 and 2 in Examples 4 and 5, and Comparative Example 3. The evaluation results are shown in Tables 1 and 2.

In Comparative Example 4, a block copolymer composition was prepared by a process described in U.S. Pat. No. 5,394,627 wherein, after completion of polymerization of isoprene, 1.2% by weight, based on the weight of isoprene, of butadiene was added and tetrachlorosilane in an amount shown in Table 2 was reacted with all other conditions remaining the same as in Example 1. The characteristics of the block copolymer composition were evaluated, and an adhesive or pressure sensitive adhesive composition was prepared from the block copolymer composition and the adhesive properties of the adhesive or pressure sensitive adhesive composition were evaluated, by the same procedures as in Example 1. The evaluation results are shown in Table 2.

In Comparative Examples 5, 6 and 7, the following commercially available styrene-isoprene-styrene block copolymer compositions A, B and C were used, respectively. Their characteristics were evaluated, and adhesive compositions were prepared from the block copolymers and their adhesive properties were evaluated, by the same procedures as in Example 1. The evaluation results are shown in Table 2.

Commercially available block copolymer composition A: "Kraton D1124P" supplied by Shell Co.

Commercially available block copolymer composition B: "Vector 4211" supplied by Dexco Co.

Commercially available block copolymer composition C: "Vector 4411" supplied by Dexco Co.

The abbreviations for coupling agents occurring in Tables 1 and 2 are as follows.

TMS: tetramethoxysilane

TCS: tetrachlorosilane

PTCS: phenyltrichlorosilane

TABLE 1

|  | Example | | | | |
| --- | --- | --- | --- | --- | --- |
|  | 1 | 2 | 3 | 4 | 5 |
| Coupling agent | TMS | TCS | TCS | TMS | TMS |
| Coupling agent/initiator mol ratio | 0.11 | 0.07 | 0.09 | 0.05 | 0.12 |
| Block copolymer | | | | | |
| Styrene content (%) | 38 | 41 | 37 | 37 | 31 |
| Mw of copolymer composition (×1,000) | 96 | 98 | 116 | 74 | 135 |
| Molecular weight distribution (Mw/Mn) | 1.43 | 1.36 | 1.39 | 1.29 | 1.46 |

TABLE 1-continued

| | Example | | | | |
|---|---|---|---|---|---|
| | 1 | 2 | 3 | 4 | 5 |
| Composition of copolymer composition (%) | | | | | |
| Diblock copolymer | 58.8 | 72.5 | 64.5 | 80.6 | 56.1 |
| Copolymer with 2 branches | 1.2 | 0 | 0 | 0 | 1.7 |
| Copolymer with 3 branches | 4.7 | 0.8 | 1.0 | 1.7 | 7.3 |
| Copolymer with 4 branches | 35.3 | 26.7 | 34.5 | 17.7 | 34.9 |
| Melt viscosity of adhesive composition (150° C., cps) | 1,930 | 3,700 | 3,800 | 1,060 | 4,500 |
| Peel adhesion (N/m) | | | | | |
| to steel | 1,170 | 1,250 | 1,200 | 1,150 | 1,120 |
| to polyethylene | 530 | 550 | 570 | 560 | 550 |
| Shear adhesion failure temperature (° C.) | 71 | 70 | 70 | 68 | 68 |

TABLE 2

| | Comparative Example | | | | | | |
|---|---|---|---|---|---|---|---|
| | 1 | 2 | 3 | 4 | 5 | 6 | 7 |
| Coupling agent | TCS | PTCS | TMS | TCS | — | — | — |
| Coupling agent/initiator mol ratio | 0.18 | 0.12 | 0.21 | 0.25 | — | — | — |
| Block copolymer | | | | | A | B | C |
| Styrene content (%) | 38 | 36 | 31 | 37 | 30 | 29 | 44 |
| Mw of copolymer composition (×1,000) | 107.6 | 92 | 151 | 125 | 145 | 120 | 90 |
| Molecular weight distribution (Mw/Mn) | 1.55 | 1.30 | 1.38 | 1.39 | 1.52 | 1.02 | 1.05 |
| Composition of copolymer composition (%) | | | | | | | |
| Diblock copolymer | 34.2 | 66.5 | 23.9 | 8.0 | 27.6 | 0 | 0 |
| Copolymer with 2 branches | 2.9 | 2.4 | 14.4 | 0 | 4.6 | 100 | 100 |
| Copolymer with 3 branches | 28.2 | 31.4 | 51.7 | 22.0 | 67.8 | 0 | 0 |
| Copolymer with 4 branches | 34.7 | 0 | 10.0 | 70.0 | 0 | 0 | 0 |
| Melt viscosity of adhesive composition (150° C., cps) | 1,870 | 2,050 | 17,500 | 3,800 | 9,200 | 6,700 | 4,200 |
| Peel adhesion (N/m) | | | | | | | |
| to steel | 960 | 1,050 | 940 | 920 | 950 | 970 | 960 |
| to polyethylene | 490 | 520 | 480 | 470 | 500 | 460 | 470 |
| Shear adhesion failure temperature (° C.) | 70 | 65 | 72 | 68 | 71 | 63 | 70 |

Industrial Applicability

The aromatic vinyl compound-isoprene block copolymer composition of the present invention is useful for a hot-melt adhesive composition, and other adhesive or pressure sensitive adhesive compositions. An adhesive or pressure sensitive adhesive composition made from the block copolymer composition of the present invention has a low-melt-viscosity and low-application-temperature and exhibits high and balanced peel adhesion and shear adhesion failure temperature.

A hot-melt adhesive made from the block copolymer composition of the present invention satisfy the following characteristics.

Melt viscosity at 150° C.: not larger than 5,000 cps
Shear adhesion failure temperature: at least 66° C.
Peel adhesion to steel: at least 1,000 N/m
Peel adhesion to polyethylene: at least 500 N/m

What is claimed is:

1. An aromatic vinyl compound-isoprene block copolymer composition comprising:
  (i) 5 to 43.9% by weight of a branched copolymer having at least four branches, represented by the following general formula (I):

$(A-B)_n X$        (I)

wherein A is a polymer block of an aromatic vinyl monomer, B is a polymer block of isoprene, X is a residue of a polyfunctional coupling agent having at least four functionalities, and n is an integer of at least 4, (ii) 56.1 to 95% by weight of a diblock copolymer represented by the following general formula (II):

$A'-B$        (II)

wherein A' is a polymer block of an aromatic vinyl monomer, which may be the same as or different from the polymer block A, and B is a polymer block of isoprene, and (iii) at least one branched copolymer selected from the group consisting of branched copolymers having two branches and branched copolymers having three branches, which are represented by the following general formula (III):

$(A''-B)_m X$        (III)

wherein A" is a polymer block of an aromatic vinyl monomer, B is a polymer block of isoprene, X is a residue of a polyfunctional coupling agent, and m is an integer of 2 or 3; the amount of the branched copolymer of formula (III) being smaller than the amount of the branched copolymer of formula (I); said block copolymer composition having a weight average molecular weight of 10,000 to 500,000.

2. The aromatic vinyl compound-isoprene block copolymer composition according to claim 1, wherein the aromatic vinyl monomer constituting the polymer block A of the branched copolymer represented by formula (I) is at least one monomer selected from styrene, α-methylstyrene, vinyltoluene and vinylnaphthalene.

3. The aromatic vinyl compound-isoprene block copolymer composition according to claim 1, wherein the content of the polymer block A of the aromatic vinyl monomer in the branched copolymer represented by formula (I) is in the range of 10 to 50% by weight based on the weight of the branched copolymer represented by formula (I).

4. The aromatic vinyl compound-isoprene block copolymer composition according to claim 1, wherein the aromatic vinyl monomer constituting the polymer block A' of the diblock copolymer represented by formula (II) is at least one monomer selected from styrene, α-methylstyrene, vinyltoluene and vinylnaphthalene.

5. The aromatic vinyl compound-isoprene block copolymer composition according to claim 1, wherein the content of the polymer block A' of the aromatic vinyl monomer in the diblock copolymer of formula (II) is in the range of 10 to 50% by weight based on the weight of the branched copolymer.

6. The aromatic vinyl compound-isoprene block copolymer composition according to claim 1, wherein the content of the branched copolymer of formula (III) is not larger than 20% by weight based on the weight of the aromatic vinyl compound-isoprene block copolymer composition.

7. The aromatic vinyl compound-isoprene block copolymer composition according to claim 1, wherein the ratio (Mw/Mn) of the weight average molecular weight (Mw) to the number average molecular weight (Mn) is not larger than 4.

8. A process for producing an aromatic vinyl compound-isoprene block copolymer composition comprising:

(i) 5 to 43.9% by weight of a branched copolymer having at least four branches, represented by the following general formula (I):

$$(A-B)_n X \qquad (I)$$

wherein A is a polymer block of an aromatic vinyl monomer, B is a polymer block of isoprene, X is a residue of a polyfunctional coupling agent having at least four functionalities, and n is an integer of at least 4, (ii) 56.1 to 95% by weight of a diblock copolymer represented by the following general formula (II'):

$$A-B \qquad (II')$$

wherein A is a polymer block of an aromatic vinyl monomer, and B is a polymer block of isoprene, and (iii) at least one branched copolymer selected from the group consisting of branched copolymers having two branches and branched copolymers having three branches, which are represented by the following general formula (III):

$$(A''-B)_m X \qquad (III)$$

wherein A'' is a polymer block of an aromatic vinyl monomer, B is a polymer block of isoprene, X is a residue of a polyfunctional coupling agent, and m is an integer of 2 or 3; the amount of the branched copolymer of formula (III) being smaller than the amount of the branched copolymer of formula (I); said block copolymer composition having a weight average molecular weight of 10,000 to 500,000, which comprises the steps of:

allowing an aromatic vinyl monomer to contact with an organic lithium initiator to prepare a polymer block A composed of aromatic vinyl monomer units and having an active terminal exhibiting a polymerization activity;

incorporating isoprene to the polymer block A-containing polymerization system whereby an A-B block copolymer is prepared, which has a structure such that the polymer block A of aromatic vinyl monomer is directly bonded to a polymer block B composed of isoprene units and having an active terminal exhibiting a polymerization activity; and then, adding a coupling agent having at least four functionalities to the A-B block copolymer-containing polymerization system to convert 5 to 43.9% by weight of the A-B block copolymer to a branched copolymer having at least four branches represented by formula (I).

9. The process for producing an aromatic vinyl compound-isoprene block copolymer composition according to claim 8, wherein the organic lithium initiator is n-butyllithium.

10. The process for producing an aromatic vinyl compound-isoprene block copolymer composition according to claim 8, wherein the polymerization reactions are conducted in a polymerization medium which is a mixed solvent composed of 5 to 50% by weight of an open chain hydrocarbon solvent having 4 to 6 carbon atoms and 95 to 50% by weight of at least one cyclic hydrocarbon solvent selected from alicyclic hydrocarbons and aromatic hydrocarbons.

11. The process for producing an aromatic vinyl compound-isoprene block copolymer composition according to claim 8, wherein the aromatic vinyl monomer is at least one monomer selected from styrene, α-methylstyrene, vinyltoluene and vinylnaphthalene.

12. The process for producing an aromatic vinyl compound-isoprene block copolymer composition according to claim 1, wherein the amounts of the aromatic vinyl monomer and isoprene are in the ranges of 10 to 50% by weight and 90 to 50% by weight, respectively, based on the total weight of these two monomers.

13. The process for producing an aromatic vinyl compound-isoprene block copolymer composition according to claim 8, wherein the polymerization of the aromatic vinyl monomer is conducted in the presence of a polar compound.

14. The process for producing an aromatic vinyl compound-isoprene block copolymer composition according to claim 13, wherein the polar compound is at least one compound selected from aromatic and aliphatic ethers, and tertiary amines, which have a relative dielectric constant of 2.5 to 5.0 at 25° C.

15. The process for producing an aromatic vinyl compound-isoprene block copolymer composition according to claim 8, wherein the amount of the coupling agent used is in the range of 0.001 to 0.2 mole per mole of the organic lithium initiator.

16. An adhesive or pressure sensitive adhesive composition comprising an aromatic vinyl compound-isoprene block copolymer composition and a tackifier, characterized in that said aromatic vinyl compound-isoprene block copolymer composition comprises:

(i) 5 to 43.9% by weight of a branched copolymer having at least four branches, represented by the following general formula (I):

$$(A\text{-}B)_n X \qquad (I)$$

wherein A is a polymer block of an aromatic vinyl monomer, B is a polymer block of isoprene, X is a residue of a polyfunctional coupling agent having at least four functionalities, and n is an integer of at least 4, and (ii) 56.1 to 95% by weight of a diblock copolymer represented by the following general formula (II):

$$A'\text{-}B \qquad (II)$$

wherein A' is a polymer block of an aromatic vinyl monomer, which may be the same as or different from the polymer block A, and B is a polymer block of isoprene, and (iii) at least one branched copolymer selected from the group consisting of branched copolymers having two branches and branched copolymers having three branches, which are represented by the following general formula (III):

$$(A''\text{-}B)_m X \qquad (III)$$

wherein A" is a polymer block of an aromatic vinyl monomer, B is a polymer block of isoprene, X is a residue of a polyfunctional coupling agent, and m is an integer of 2 or 3; the amount of the branched copolymer of formula (III) being smaller than the amount of the branched copolymer of formula (I); said block copolymer composition having a weight average molecular weight of 10,000 to 500,000.

17. The adhesive or pressure sensitive adhesive composition according to claim 16, wherein the content of the tackifier is in the range of 10 to 500 parts by weight based on 100 parts by weight of the aromatic vinyl compound-isoprene block copolymer composition.

18. The adhesive or pressure sensitive adhesive composition according to claim 16, wherein the aromatic vinyl monomer constituting the polymer block A in the branched copolymer of formula (I) and the aromatic vinyl monomer constituting the polymer block A' in the diblock copolymer of formula (II) are at least one monomer selected from styrene, α-methylstyrene, vinyltoluene and vinylnaphthalene.

19. The adhesive or pressure sensitive adhesive composition according to claim 16, wherein the content of the polymer block A of the aromatic vinyl monomer in the branched copolymer represented by formula (I) is in the range of 10 to 50% by weight based on the weight of the branched copolymer, and the content of the polymer block A' of the aromatic vinyl monomer in the diblock copolymer of formula (II) is in the range of 10 to 50% by weight based on the weight of the diblock copolymer.

* * * * *